United States Patent
Iijima et al.

(10) Patent No.: US 9,386,260 B2
(45) Date of Patent: Jul. 5, 2016

(54) PROJECTOR WITH VARIABLE SYNCHRONIZATION TIMING

(71) Applicant: SEIKO EPSON CORPORATION, Tokyo (JP)

(72) Inventors: Chiyoaki Iijima, Ina (JP); Yasushi Maruyama, Matsumoto (JP); Osamu Ishibashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 139 days.

(21) Appl. No.: 14/244,216

(22) Filed: Apr. 3, 2014

(65) Prior Publication Data
US 2014/0313427 A1 Oct. 23, 2014

(30) Foreign Application Priority Data

Apr. 22, 2013 (JP) ................. 2013-089118

(51) Int. Cl.
*G03B 21/00* (2006.01)
*H04N 5/74* (2006.01)
*G09G 3/34* (2006.01)

(52) U.S. Cl.
CPC .......... *H04N 5/7441* (2013.01); *G09G 3/3406* (2013.01); *G09G 2320/0247* (2013.01); *G09G 2320/048* (2013.01); *H04N 2005/745* (2013.01)

(58) Field of Classification Search
CPC ............. G09G 3/00; G09G 3/36; G09G 3/20; F09G 3/34; H04N 5/74; G03B 21/00
See application file for complete search history.

(56) References Cited

U.S. PATENT DOCUMENTS

2012/0218175 A1* 8/2012 Uemura ............... G09G 3/3406
345/102

FOREIGN PATENT DOCUMENTS

| JP | A-2003-156798 | 5/2003 |
| JP | 2009198886 A * | 9/2009 |
| JP | A-2009-198886 | 9/2009 |

OTHER PUBLICATIONS

Extended European Search Report issued in European Patent Application No. 14165512.6 dated Jul. 25, 2014.

* cited by examiner

*Primary Examiner* — Sultan Chowdhury
*Assistant Examiner* — Danell L Owens
(74) *Attorney, Agent, or Firm* — Oliff PLC

(57) ABSTRACT

A projector includes an alternately-current-driven light source and a liquid crystal light valve that modulates light output from the light source. The light source and the liquid crystal light valve are driven under a condition that a current drive signal of the light source and a vertical synchronizing signal of the liquid crystal light valve are synchronized, and a synchronization timing of the current drive signal and the vertical synchronizing signal is changed to a different synchronization timing based on accumulated operating time at intervals of each time or a plural times of activation or with the same synchronization timing.

7 Claims, 7 Drawing Sheets

PROJECTOR WITH VARIABLE SYNCHRONIZATION TIMING

BACKGROUND

1. Technical Field

The present invention relates to a projector.

2. Related Art

It has been known that, in a projector that modulates and projects a light source beam output from a light source lamp with a liquid crystal light valve, flicker is suppressed by synchronization of the drive frequency of the alternately-current-driven light source lamp and the drive frequency of the liquid crystal light valve (for example, see Patent Document 1 (JP-A-2003-156798)). Further, it has been known that, for reduction of noise due to pulse for suppression of flicker superimposed on the drive waveform of the light source lamp, brightness of a video signal is reduced in a period in which the pulse is input (see Patent Document 2 (JP-A-2009-198886)).

However, it has been turned out that, if the projector is operated in a long period while the drive frequency of the light source lamp and the drive frequency of the liquid crystal light valve are synchronized, brightness ununiformity are caused in a specific position of a projected image.

SUMMARY

An advantage of some aspects of the invention is to provide a projector with reduced flicker and reduced brightness ununiformity caused at continuous operation in a long period.

An aspect of the invention provides a projector including an alternately-current-driven light source, and a liquid crystal light valve that modulates light output from the light source, wherein the light source and the liquid crystal light valve are driven under a condition that a current drive signal of the light source and a vertical synchronizing signal of the liquid crystal light valve are synchronized, and a synchronization timing of the current drive signal and the vertical synchronizing signal may be changed to a different synchronization timing based on accumulated operating time at intervals of each time or a plural times of activation or with the same synchronization timing.

According to the configuration, the synchronization timing of the vertical synchronizing signal of the liquid crystal light valve and the current drive signal of the light source is changed to a different synchronization timing at predetermined operation or after a lapse of a predetermined time Thereby, the selection timing of the scan line of the liquid crystal light valve and the fluctuation timing of the intensity of the light source are shifted. As a result, brightness ununiformity caused when the liquid crystal light valve and light source are driven over a long period of time may be suppressed.

The projector may be configured such that a reference value of the accumulated operating time for changing the synchronization timing is from one hour to 300 hours. The synchronization timing is set in the above described range, and thereby, the time of occurrence of flicker of the screen when the synchronization timing is changed may be suppressed and increase in the brightness ununiformity may be suppressed.

The projector may be configured such that the projector includes a timing control part that controls the synchronization timing based on the accumulated operating time at intervals of each time or a plural times of activation or with the same synchronization timing. That is, a circuit or software that controls the synchronization timing may be provided.

The projector may be configured such that the projector includes a light source control part that controls the light source, a light valve control part that controls the liquid crystal light valve, and the vertical synchronizing signal for driving the liquid crystal light valve is input to the light valve control part and the timing control part, the timing control part generates a light source synchronizing signal based on the vertical synchronizing signal and outputs the signal to the light source control part, and the light source control part generates the current drive signal synchronized with the vertical synchronizing signal based on the light source synchronizing signal and drives the light source based on the current drive signal.

According to the configuration, the liquid crystal light valve and the light source may be synchronously driven based on the common vertical synchronizing signal.

The projector may be configured such that the current drive signal is an alternating current in which a current is increased in a predetermined pulse period, and the timing control part sets a delay time of an output timing of the pulse period with respect to an input timing of the vertical synchronizing signal.

In the configuration, the current is increased in the pulse period, and thereby, the intensity of the light source is increased in the pulse period and brightness ununiformity due to the synchronous driving in a long period are prone to be caused. In the configuration, the brightness ununiformity may be effectively suppressed by the above described changing operation of the synchronization timing.

The projector may be configured such that the timing control part refers to a memory part that stores information on a plurality of synchronization timings.

According to the configuration, the synchronization timing may be changed based on the information previously held in the memory part.

The projector may be configured such that the timing control part sets the synchronization timing based on a random number acquired from a random number generation part that generates random numbers.

According to the configuration, the synchronization timing is set based on the random number, and there is a low probability that the same synchronization timing as the previously set synchronization timing is set again. Thereby, the synchronization timings are distributed and increase in the brightness ununiformity may be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, embodiments of the invention will be explained using the drawings.

Note that the scope of the invention is not limited to the following embodiments, but may be arbitrarily changed within the scope of the technical idea of the invention. Further, in the following drawings, scales, numerals, etc. in the actual structures and respective structures are different for clarification of the respective configurations.

First Embodiment

Figure 1:
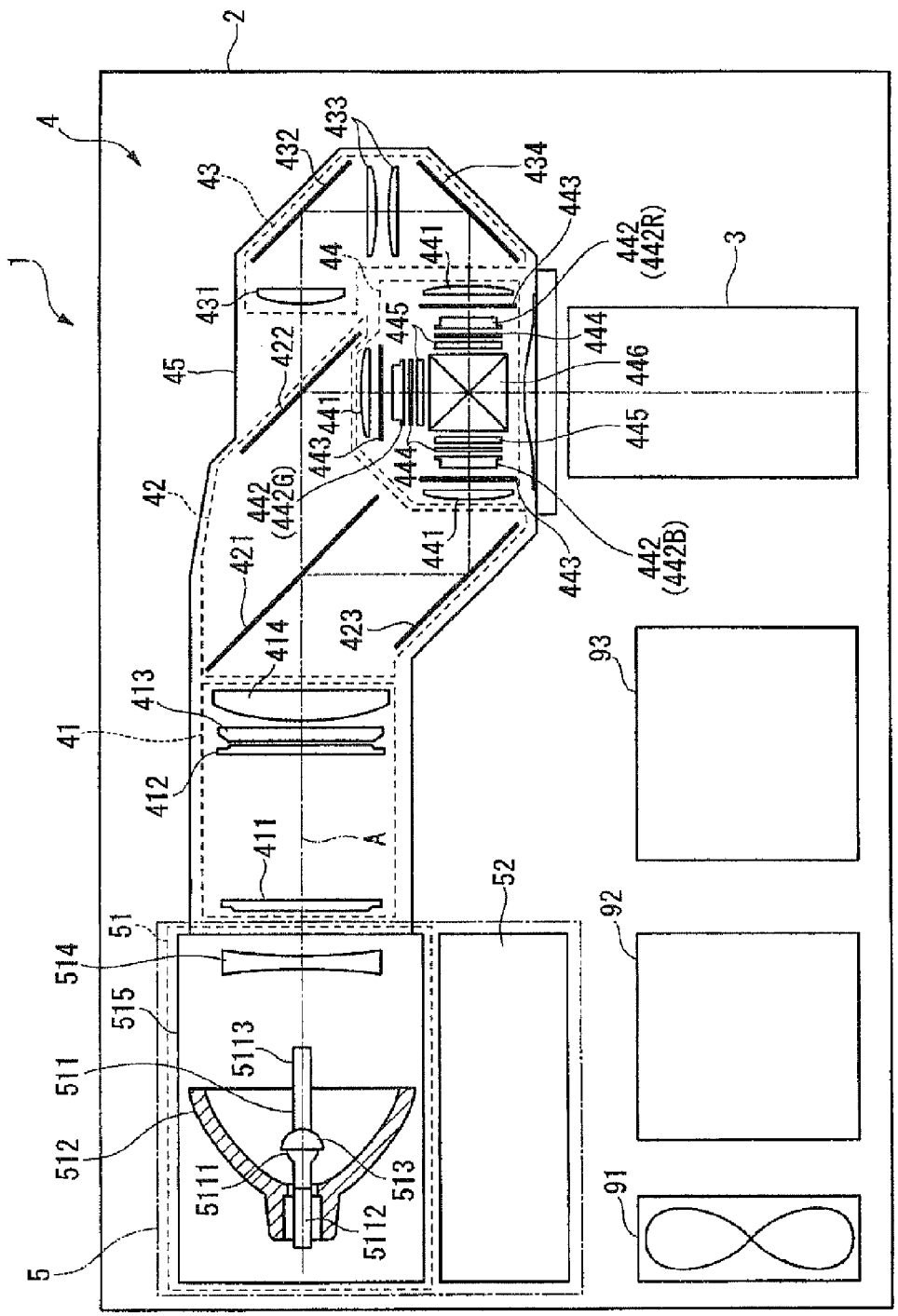
FIG. 1 is a schematic configuration diagram of a projector according to a first embodiment.

FIG. 1 is a schematic configuration diagram of a projector according to the first embodiment. A projector 1 is a projection-type projector that projects color lights containing image information generated in light modulators onto a screen (projected surface) via a projection system.

As shown in FIG. 1, the projector 1 of the embodiment includes an exterior case 2, a projection system 3, and an optical unit 4. Within the exterior case 2, a cooling unit 91, a power supply unit 92, a control unit 93, etc. are provided in addition to the projection system 3 and the optical unit 4.

The exterior case 2 has a nearly rectangular parallelepiped shape, for example, and is formed using a metal, a synthetic resin, or the like. Though not illustrated, an intake opening for introducing the air from outside into inside of the projector 1 and an exhaust opening for exhausting the air warmed inside of the projector 1 are formed in the exterior case 2.

The optical unit 4 optically processes luminous flux output from a light source and forms an optical image (color image) in response to image information. The projection system 3 enlarges and projects the optical image (color image) formed by the optical unit 4 on a screen (not shown).

The cooling unit 91 sends cooling air into a cooling channel formed within the projector 1 and cools the heat generated within the projector 1. The cooling unit 91 has a sirocco fan that introduces the cooling air outside of the projector 1 from the intake opening of the exterior case 2 into the inside, and a cooling fan for cooling the various units (the optical unit 4, the power supply unit 92, the control unit 93, etc.).

The power supply unit 92 converts the commercial alternating current into direct current and supplies the current to the various units within the exterior case 2. The control unit 93 totally controls the whole projector 1. The control unit 93 includes control parts that individually control the respective parts of the optical unit 4 and a control part that generally controls them.

The optical unit 4 includes a light source unit 5, an integrator system 41, a color separation system 42, a relay system 43, an optical device 44, and a casing 45.

The light source unit 5 has a light source device 51 and a light source drive device 52 that drives the light source device 51. The light source device 51 has a light source lamp (light source) 511 that outputs radial beams, a first reflector (main reflector) 512 that reflects the radiated light output from the light source lamp 511, a second reflector (sub-reflector) 513, a parallelizing lens 514, and a casing 515.

As the light source lamp 511, a halogen lamp, a metal halide lamp, or an ultrahigh-pressure mercury lamp is used. In the case of the embodiment, the light source lamp 511 has a light emitting part 5111 having a nearly spherical shape in which a discharge material is sealed, and sealing parts 5112, 5113 extended from the light emitting part 5111 in directions away from each other. Electrodes extending from the light emitting part 5111 are respectively sealed in the sealing part 5112 and the sealing part 5113.

The first reflector 512 is an ellipsoidal mirror in the case of the embodiment. The second reflector 513 is a member having a nearly semi-spherical shape attached to the front side surface (the surface at the parallelizing lens 514 side) of the light emitting part 5111 of the light source lamp 511, and reflects the light output from the light emitting part 5111 toward the first reflector 512 side. The parallelizing lens 514 parallelizes the luminous flux reflected and output by the first reflector 512 with respect to an optical axis A. Note that the parallelizing lens 514 may be provided as necessary.

The integrator system 41 homogenizes the light output from the light source unit 5 and illuminates an image formation area of a liquid crystal light valve (light modulator), which will be described later, nearly homogeneously. The integrator system 41 includes a first lens array 411, a second lens array 412, a polarization conversion element 413, and a superimposing lens 414.

The first lens array 411 has a configuration in which small lenses having nearly rectangular contours are arranged in a matrix as seen from the optical axis direction of the light output from the light source unit 5. Each small lens divides the luminous flux output from the light source unit 5 into a plurality of partial luminous fluxes.

The second lens array 412 has a configuration in which small lenses are arranged in a matrix like the first lens array 411. The second lens array 412, with the superimposing lens 414, forms images of the respective small lenses of the first lens array 411 onto the liquid crystal light valve, which will be described later.

The polarization conversion element 413 is provided between the second lens array 412 and the superimposing lens 414, and converts the light from the second lens array 412 into polarized light in the same vibration direction. Therefore, the partial luminous fluxes divided by the first lens array 411 are converted into single polarized light by the polarization conversion element 413 and superimposed on the image formation area of the liquid crystal light valve to be described later by the second lens array 412 and the superimposing lens 414.

The color separation system 42 includes two dichroic mirrors 421, 422 and a reflection mirror 423. The luminous flux output from the integrator system 41 is separated into color lights of three colors of red (R), green (G), blue (B) by the dichroic mirrors 421, 422.

The relay system 43 includes a light incident-side lens 431, a relay lens 433, and reflection mirrors 432, 434. The relay system 43 guides red light separated by the color separation system 42 to the liquid crystal light valve for red light, which will be described later.

The dichroic mirror 421 reflects a blue light component of the luminous flux output from the integrator system 41 and transmits a green light component and a red light component. The blue light reflected by the dichroic mirror 421 is reflected by the reflection mirror 423, passes through a field lens 441, and reaches the liquid crystal light valve for blue light, which will be described later. The field lens 441 converts the luminous flux output from the second lens array 412 into luminous flux in parallel to the center axis (main beam) thereof. The other field lenses 441 provided at the light incident sides of the liquid crystal light valves for green light and red light have the same function.

Of the green light and the red light transmitted through the dichroic mirror 421, the green light is reflected by the dichroic mirror 422, passes through the field lens 441, and reaches the liquid crystal light valve for green light to be described later.

On the other hand, the red light is transmitted through the dichroic mirror 422, passes through the relay system 43, and further passes through the field lens 441 and reaches the liquid crystal light valve for red light to be described later.

The optical device 44 includes three liquid crystal light valves 442 (the liquid crystal light valve 442R for red light, the liquid crystal light valve 442G for green light, and the liquid crystal light valve 442B for blue light) as light modulators. A light incident-side polarizer 443 is provided at the luminous flux incident side of each liquid crystal light valve 442. A viewing angle compensation plate 444 and a light exiting-side polarizer 445 are sequentially provided from the liquid crystal light valve 442 side at the luminous flux exiting side of each liquid crystal light valve 442. The three liquid crystal light valves 442 are provided on the respective surfaces of a cross dichroic prism 446 as a light combining optical device.

Though not specifically illustrated, the liquid crystal light valve 442 has a configuration in which liquid crystal as an electrooptic material is enclosed between a pair of glass substrates. In the liquid crystal light valve 442, the orientation of the liquid crystal is controlled based on a drive signal output from the control unit 93, and the polarized light entering from the light incident-side polarizer 443 is modulated. As the light incident-side polarizer 443 and the light exiting-side polarizer 445, either organic polarizers formed by stretching of a resin film containing a dye or inorganic polarizers represented by wire grid polarizers may be used.

The cross dichroic prism 446 combines the color lights modulated by the liquid crystal light valves 442, which have been modulated by the liquid crystal light valves 442R, 442G, 442B and respectively output from the three light exiting-side polarizers 445, and forms a color image.

The projection system 3 projects the light combined by the cross dichroic prism 446. The projection system 3 includes a plurality of projection lenses and a projection lens casing housing the plurality of projection lenses.

The casing 45 is formed using a metal or the like, for example. Inside of the casing 45, the above described optical components (the integrator system 41, the color separation system 42, the relay system 43, and the optical device 44) are placed in predetermined positions, and optical paths from the light source unit 5 to the projection system 3 are formed.

Figure 2:
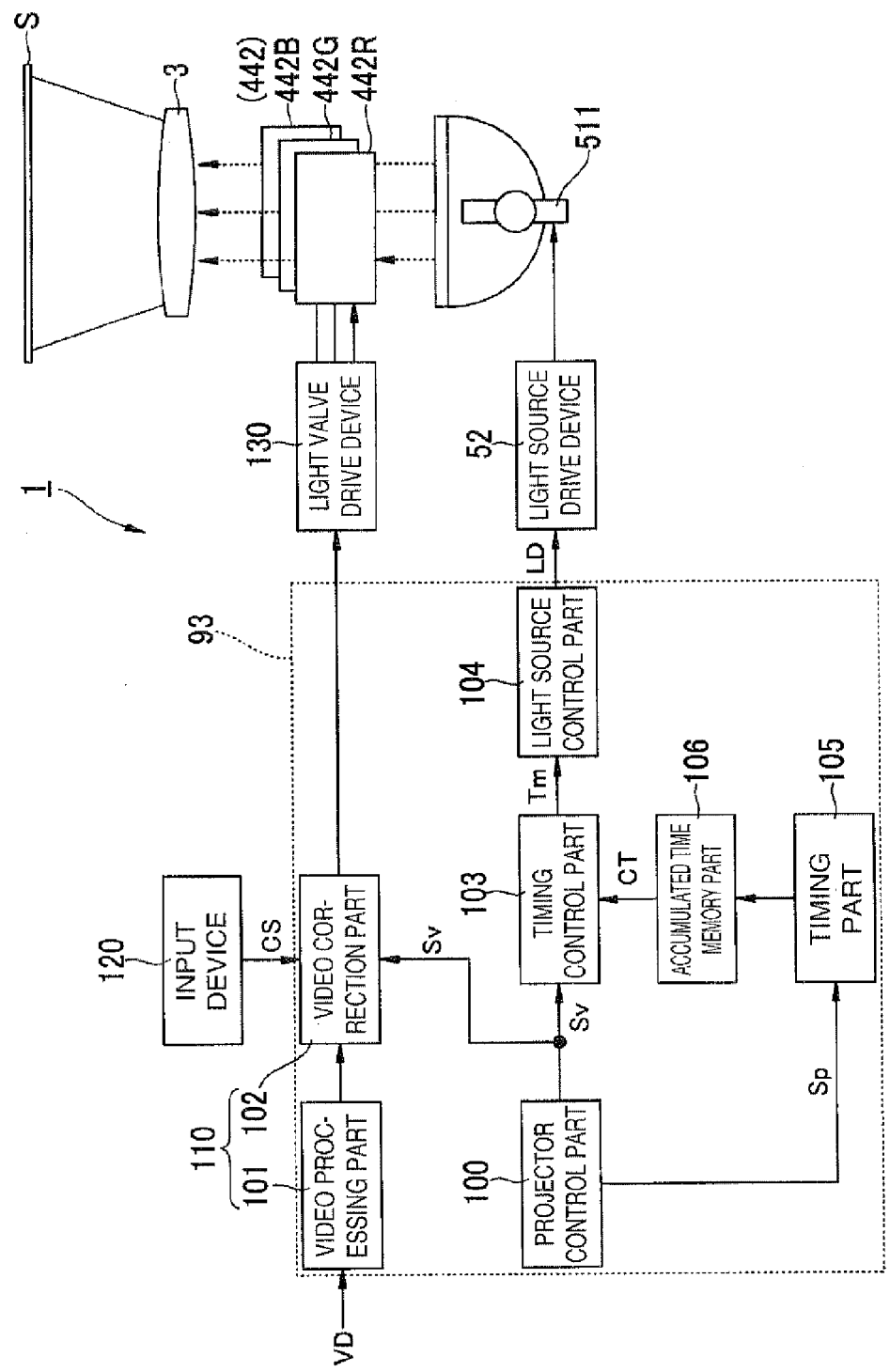
FIG. 2 is a functional block diagram showing a main part of the projector of the embodiment.

FIG. 2 is a functional block diagram showing a main part of the projector of the embodiment.

As shown in FIG. 2, in the control unit 93 of the projector 1, a projector control part 100, a liquid crystal light valve control part 110 (a video processing part 101, a video correction part 102), a timing control part 103, a light source control part 104, a timing part 105, and an accumulated time memory part 106 are provided.

Further, to the control unit 93, an input device 120 that receives operation input from a user, a liquid crystal light valve drive device 130 that drives the liquid crystal light valve 442, and the light source drive device 52 that drives the light source lamp 511.

FIG. 2 shows a drive system of the liquid crystal light valve 442 and a drive system of the light source lamp 511. The drive system of the liquid crystal light valve 442 includes the projector control part 100, the liquid crystal light valve control part 110 (the video processing part 101, the video correction part 102), the liquid crystal light valve drive device 130, and the input device 120. The drive system of the light source lamp 511 includes the projector control part 100, the timing control part 103, the light source control part 104, the light source drive device 52, the timing part 105, and the accumulated time memory part 106.

First, the drive system of the liquid crystal light valve 442 will be explained.

In the drive system of the liquid crystal light valve 442, the video processing part 101 is connected to the video correction part 102. The video correction part 102 is connected to the projector control part 100, the input device 120, and the liquid crystal light valve drive device 130. The liquid crystal light valve drive device 130 is connected to the liquid crystal light valves 442.

The input device 120 receives various kinds of operation from the user. The input device 120 includes an operation input part with which the user performs operation input, and an operation signal output part that outputs an operation signal to the control unit 93 based on the input to the operation input part.

The operation input part forming the input device 120 includes a button, a wheel, a touch panel, a remote provided on the exterior case 2, for example. The operation signal output part is adapted to receive a detection signal output from the operation input part in response to the type of the operation input part. In the embodiment, a video adjustment signal CS is output from the input device 120 to the video correction part 102.

The projector control part 100 includes a CPU (Central Processing Unit), a RAM (Random Access Memory) used for temporal storage of various kinds of data or the like, a ROM (Read Only Memory) and a flash memory used for storage of control programs and various kinds of data, etc. The projector control part 100 operates according to the control program read out from the ROM or the like and generally controls the operation of the projector 1.

Note that, in the embodiment, of the signals output from the projector control part 100, only signals necessary for explanation are shown in FIG. 2. In the embodiment, the projector control part 100 outputs vertical synchronizing signals Sv to the video correction part 102 and the timing control part 103 and outputs a projector activation signal Sp to the timing part 105.

The video processing part 101 acquires a video signal VD from outside of the projector 1, for example, a personal computer. The video processing part 101 outputs the acquired video signal VD to the video correction part 102.

The video correction part 102 performs various kinds of correction processing on the video signal VD based on the video adjustment signal CS input from the input device 120. The video correction part 102, on the video signal VD, performs image quality adjustment including brightness adjustment, contrast adjustment, sharpness adjustment and image distortion correction including trapezoidal distortion when elevation projection is performed by the projector 1. The video correction part 102 adjusts the video signal VD based on the vertical synchronizing signal Sv and outputs the signal to the liquid crystal light valve drive device 130.

The liquid crystal light valve drive device 130 generates a drive signal for driving the liquid crystal light valve 442 based on the input video signal VD, and outputs the signal to the liquid crystal light valve 442.

Next, the drive system of the light source lamp 511 will be explained.

In the drive system of the light source lamp 511, the projector control part 100 is connected to the timing control part 103 and the timing part 105. The timing part 105 is connected to the accumulated time memory part 106. The accumulated time memory part 106 is connected to the timing control part 103. The timing control part 103 is connected to the light source control part 104. The light source control part 104 is connected to the light source drive device 52. The light source drive device 52 is connected to the light source lamp 511.

The projector control part 100 outputs the vertical synchronizing signal Sv for driving the liquid crystal light valve to the timing control part 103. Further, the projector control part 100 outputs the projector activation signal Sp to the timing part 105. The timing part 105 measures a lapse time from the time when the projector activation signal Sp is input and outputs the time to the accumulated time memory part 106. The accumulated time memory part 106 stores an accumulated value of the lapse times input from the timing part 105. The accumulated time memory part 106 outputs an accumulated operating time CT to the timing control part 103.

The accumulated operating time CT stored by the accumulated time memory part 106 is an accumulated value of operating times when the projector 1 is activated. As the accumulated operating time CT, an accumulated value of times when the liquid crystal light valve 442 is irradiated with illumination light or an accumulated value of times when the liquid crystal light valve 442 performs image formation operation (image display operation) may be used.

The timing control part 103 generates a light source synchronizing signal Tm for adjustment of the synchronization timing of the vertical synchronizing signal Sv of the liquid crystal light valve 442 and the current drive signal of the light source lamp 511 based on the vertical synchronizing signal Sv input from the projector control part 100 and the accumulated operating time CT input from the accumulated time memory part 106. The timing control part 103 outputs the generated light source synchronizing signal Tm to the light source control part 104.

The light source control part 104 generates a current drive signal LD for driving of the light source lamp 511 based on the light source synchronizing signal Tm input from the timing control part 103. The light source drive device 52 generates a lamp current based on the current drive signal LD input from the light source control part 104 and supplies the lamp current to the light source lamp 511.

Figure 3:
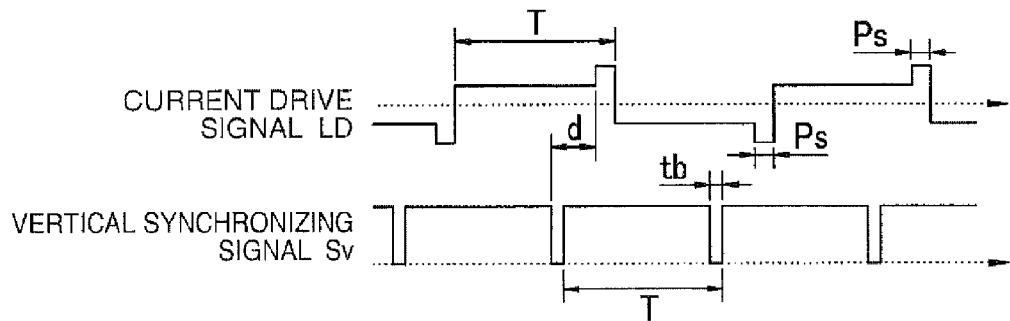
FIG. 3 shows an example of a current drive signal and a vertical synchronizing signal.

Here, FIG. 3 shows an example of the current drive signal LD and the vertical synchronizing signal Sv. In the embodiment, the current drive signal LD is an alternating current with a period T, and has a pulse period Ps in which the current is increased by pulse superimposition in a position immediately before reversal of polarity of the alternating-current pulse. The pulse period Ps is provided for suppression of flicker of discharge arc, and the lamp intensity increases in the pulse period Ps. The pulse amplitude and the pulse width superimposed in the pulse period Ps are predetermined in response to the type of lamp, drive power, or the like.

On the other hand, the vertical synchronizing signal Sv is rectangular wave having a falling period tb with respect to the period T. The falling period tb is in a vertical blanking period.

In the embodiment, the light source synchronizing signal Tm is a signal for setting a delay time d of the pulse period Ps with respect to the falling period tb of the vertical synchronizing signal. For example, the timing control part 103 may be adapted to detect the falling period tb of the vertical synchronizing signal Sv, and then, output synchronizing pulse (light source synchronizing signal Tm) to the light source control part 104 after a lapse of the delay time d. Alternatively, the timing control part 103 may be adapted to output rectangular wave formed by delaying the vertical synchronizing signal Sv by the delay time d as the light source synchronizing signal Tm.

The light source control part 104 generates the current drive signal LID based on the light source synchronizing signal Tm set in the above described manner, and thereby, the current drive signal LID synchronized with predetermined timing with respect to the vertical synchronizing signal Sv is generated. Then, the light source lamp 511 is driven based on the current drive signal LD, and the liquid crystal light valve 442 and the light source lamp 511 are driven in synchronization.

Note that, in the embodiment, the frequency of the vertical synchronizing signal Sv and the frequency of the current drive signal LD are the same, however, the frequency of the current drive signal LD may be the integral multiple of the frequency of the vertical synchronizing signal Sv.

Next, the operation of the timing control part in the projector having the above described configuration will be explained with reference to FIG. 4 further in detail.

Figure 4:
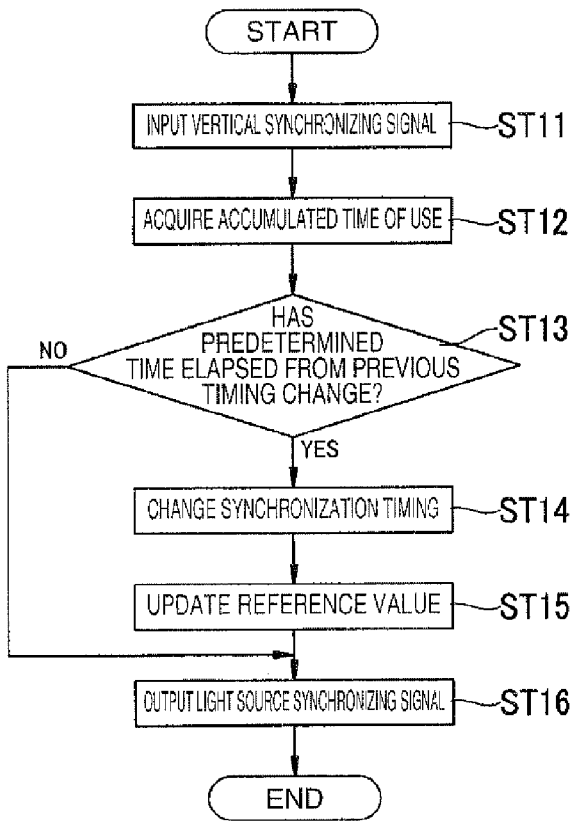
FIG. 4 shows an operation flow of a timing control part.

FIG. 4 shows an operation flow of the timing control part. As shown in FIG. 4, the light source synchronizing signal output operation by the timing control part 103 includes steps ST11 to ST16 shown in FIG. 4.

First, at step ST11, the vertical synchronizing signal Sv is input from the projector control part 100 to the timing control part 103.

Then, at step ST12, the timing control part 103 acquires the accumulated operating time CT from the accumulated time memory part 106.

Then, at step ST13, the timing control part 103 calculates the accumulated operating time CT acquired from the accumulated time memory part 106 and a lapse time from the reference value of the accumulated operating time set in the timing control part 103. Here, the reference value of the accumulated operating time is the accumulated operating time CT when the synchronization timing of the vertical synchronizing signal Sv of the liquid crystal light valve 442 and the current drive signal LD of the light source lamp 511 is changed at the previous time.

If the accumulated operating time CT is after a lapse of a predetermined time or more with respect to the reference value, the process moves to step ST14 (ST13—YES). On the other hand, if the lapse time with respect to the reference value is less than the predetermined time, the process moves to step ST16 (ST13—NO).

The lapse time as the determination reference may be set to one hour, 24 hours, 100 hours, 300 hours, or the like, for example, in a range from one hour to 300 hours. If the determination reference of the lapse time is set to less than one hour, the synchronization timing is changed at a plurality of times during use of the projector 1 (during video display), and flicker of the screen when the synchronization timing is changed may occur at a plurality of times. On the other hand, if the determination reference of the lapse time is set to a value more than 300 hours, apparent brightness ununiformity are highly likely to be caused. The determination reference of the lapse time may be set in response to the likelihood of brightness ununiformity in the liquid crystal light valve 442, the type of the light source lamp 511, or the like.

If the process moves to step ST14, the timing control part 103 changes the synchronization timing of the current drive signal LD with respect to the vertical synchronizing signal Sv. Specifically, the delay time d shown in FIG. 3 is set to a different value from the current set value. The timing control part 103 sets a new delay time d by addition or subtraction of the time for scanning of 100 scan lines to or from the currently set delay time d, for example. Then, at step ST15, the timing control part 103 updates the held reference value to the accumulated operating time CT acquired from the accumulated time memory part 106. Then, the process moves to step ST16.

Then, at step ST16, the timing control part 103 generates the light source synchronizing signal Tm based on the set delay time d and outputs the signal to the light source control part 104.

Continuous Operating Test

In order to confirm the suppression effect of brightness ununiformity according to the above described driving method, continuous operating tests for 3000 hours were conducted with the reference value of the accumulated operating time respectively set to one hour, 24 hours, 100 hours, 300 hours. As a result, in any of the cases of the reference values, no brightness ununiformity were caused in projected videos during periods of continuous use. On the other hand, for comparison, a continuous operating test for 3000 hours was conducted without changing the synchronization timing in response to the accumulated operating time, and apparent brightness ununiformity were recognized.

As explained in detail above, in the projector 1 of the embodiment, by the timing control part 103 that controls the synchronization timing of the vertical synchronizing signal Sv and the current drive signal LD, the operation of changing the synchronization timing to a different timing at each time when the time of continuous use of the projector 1 is equal to or more than a predetermined time. Thereby, the timing of the pulse period Ps in which the drive current of the light source lamp 511 increases and the selection timing of the scan line in the image formation area of the liquid crystal light valve 442 are shifted at each time when a predetermined time of use elapses. As a result, repeated radiation of the high-intensity illumination light is suppressed in the period of selection of a specific scan line of the liquid crystal light valve 442. In this manner, the brightness ununiformity caused when the liquid crystal light valve 442 and light source lamp 511 are driven over a long period may be suppressed.

Note that, according to the verification by the inventors, when the continuous drive is performed for over 300 hours while the synchronization timing of the liquid crystal light valve 442 and light source lamp 511 is held constant, brightness ununiformity are caused in a specific position of the projected image, however, when the continuous drive is performed for over 300 hours while the synchronization timing is varied, the position where brightness ununiformity are caused changes. In the embodiment, utilizing the phenomenon, the synchronization timing is shifted before the brightness ununiformity are noticed and visually recognized, the position where the brightness ununiformity are caused is shifted, and thereby, prominent brightness ununiformity caused in a specific position are suppressed.

Further, in the projector 1 of the embodiment, the liquid crystal light valve 442 and the light source lamp 511 are driven under the condition that the vertical synchronizing signal By of the liquid crystal light valve 442 and the current drive signal LD for driving of the light source lamp 511 are synchronized. Thereby, generation of scroll noise of the projected image is suppressed.

Note that, in the embodiment, in order to obtain the lapse time of the synchronized driving at the same synchronization timing, the reference value of the accumulated operating time is held in the timing control part 103 and the difference between the reference value and the accumulated operating time CT acquired from the accumulated time memory part 106 is calculated, however, the invention is not limited to the configuration. For example, the accumulated time memory part 106 may be adapted to reset the accumulated operating time according to a command of the timing control part 103. In this case, at each time when the synchronization timing is changed in the timing control part 103, the accumulated operating time of the accumulated time memory part 106 is reset to zero. Accordingly, the accumulated operating time held in the accumulated time memory part 106 is the accumulated value of time of use with the same synchronization timing, and the timing control part 103 determines whether or not change of the synchronization timing is necessary by comparison between the accumulated operating time CT acquired from the accumulated time memory part 106 and the determination reference of the lapse time.

Second Embodiment

Next, a projector of the second embodiment will be explained with reference to FIGS. 5 and 6.

Figure 5:
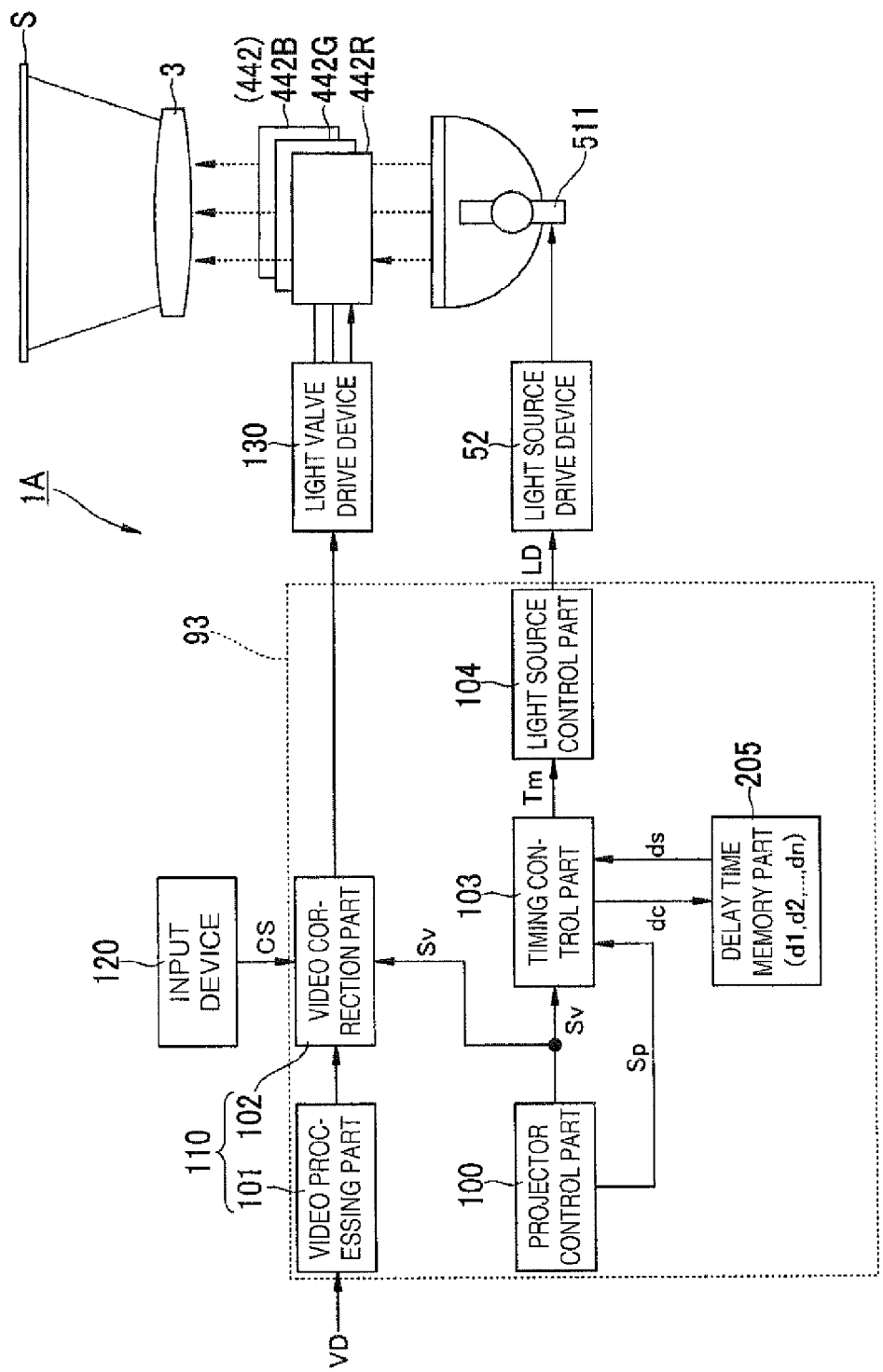
FIG. 5 is a block diagram showing a main part of a projector according to a second embodiment.

FIG. 5 is a block diagram showing a main part of the projector according to the second embodiment. FIG. 6 shows an operation flow of a timing control part provided in the projector according to the second embodiment.

A projector 1A of the embodiment has the same basic configuration as that of the first embodiment shown in FIG. 1. The projector 1A is different from that of the first embodiment in the changing operation of the synchronization timing and the functional configuration for realization of the changing operation. Accordingly, in the following explanation, the parts in common with the first embodiment will be appropriately omitted. Further, in FIGS. 5 and 6, the component elements in common with FIGS. 1 to 4 have the same signs and their detailed explanation will be omitted.

As shown in FIG. 5, a delay time memory part (memory part) 205 is provided in the control unit 93 of the projector 1A. In the lamp drive system of the projector 1A, the timing control part 103 is connected to the projector control part 100, the delay time memory part 205, and the light source control part 104.

The projector control part 100 supplies the vertical synchronizing signal Sv of the liquid crystal light valve 442 and the projector activation signal Sp to the timing control part 103.

The delay time memory part 205 stores selection values d1 to do of a plurality of (e.g., n) delay times used for setting of the synchronization timing in the timing control part 103 in a condition in which they can be referred to from the timing control part 103. Further, the set value of the delay time may be input or written from the timing control part 103 in the delay time memory part 205.

Next, the operation of the timing control part in the projector having the above described configuration will be explained further in detail with reference to FIG. 6.

Figure 6:
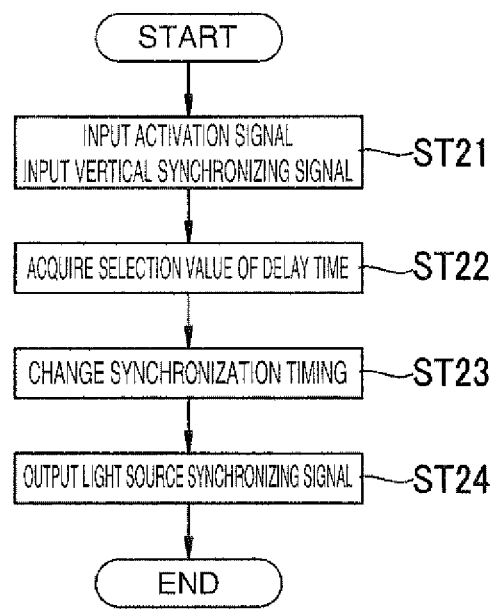
FIG. 6 shows an operation flow of a timing control part according to the second embodiment.

The light source synchronizing signal output operation by the timing control part 103 according to the embodiment includes steps ST21 to ST24 shown in FIG. 6.

First, at step ST21, the projector activation signal Sp and the vertical synchronizing signal Sv are input from the projector control part 100 to the timing control part 103.

Then, at step ST22, the timing control part 103 acquires a selection value ds of the delay time for setting the synchronization timing from the delay time memory part 205. Concurrently, the timing control part 103 refers to the memory area of the delay time memory part 205 using a selection value dc of the delay time corresponding to the current synchronization timing.

In the delay time memory part 205, for example, preset n selection values d1 to dn are stored. The timing control part 103 selects, among the n selection values d1 to dn stored in the delay time memory part 205, one of (n−1) selection values different from the set value dc of the delay time corresponding to the current synchronization timing, and acquires the value as the selection value ds. The method of selecting the selection value ds is not particularly limited, however, the selection values d1 to dn may be sequentially selected or randomly selected.

Further, a plurality of selection histories of the selection values d1 to do may be stored in the delay time memory part 205, and the selection value ds may be determined with reference to the selection histories. Thereby, selection of the same selection value ds shortly afterward may be suppressed.

Then, at step ST23, the timing control part 103 changes the synchronization timing of the current drive signal LD with respect to the vertical synchronizing signal Sv based on the selection value ds of the delay time acquired from the delay time memory part 205. Specifically, the selection value ds is set as the delay time d shown in FIG. 3.

Then, at step ST24, the timing control part 103 generates the light source synchronizing signal Tm based on the set delay time d (selection value ds), and outputs the signal to the light source control part 104.

Through the above described operation, the synchronization timing of the vertical synchronizing signal Sv of the liquid crystal light valve 442 and the current drive signal LD of the light source lamp 511 is changed.

Use Test

In order to confirm the suppression effect of brightness ununiformity according to the above described driving method, use tests were conducted with the activation time of the projector set to continuous 16 hours and the downtime set to continuous eight hours until the accumulation of the activation time becomes 3000 hours. As a result, no brightness ununiformity were caused in projected videos during periods of use. On the other hand, for comparison, a use test was conducted under the same condition without changing the synchronization timing with respect to each activation, and apparent brightness ununiformity were recognized.

As explained in detail above, in the projector 1A of the embodiment, the timing control part 103 that controls the synchronization timing of the vertical synchronizing signal Sv and the current drive signal LD executes the operation of changing the synchronization timing to a different timing at each time when the projector 1A is activated. Thereby, the timing of the pulse period Ps in which the drive current of the light source lamp 511 increases and the selection timing of the scan line in the image formation area of the liquid crystal light valve 442 are shifted at each time when the use of the projector 1A is started. As a result, repeated radiation of the high-intensity illumination light is suppressed in the period of selection of a specific scan line of the liquid crystal light valve 442. In this manner, the brightness ununiformity caused when the liquid crystal light valve 442 and light source lamp 511 are driven over a long period may be suppressed.

Note that, in the embodiment, the synchronization timing of the liquid crystal light valve 442 and light source lamp 511 is changed at each time when the projector 1A is activated, however, the invention is not limited to that. For example, the synchronization timing may be changed at intervals of a plurality of (two to twenty) times of activation of the projector 1A. Further, like the first embodiment, the accumulated operating time may be measured and the synchronization timing may be changed according to the method of the embodiment when the projector is activated after a lapse of a predetermined accumulated operating time.

Third Embodiment

Next, a projector of the third embodiment will be explained with reference to FIGS. 7 and 8.

Figure 7:
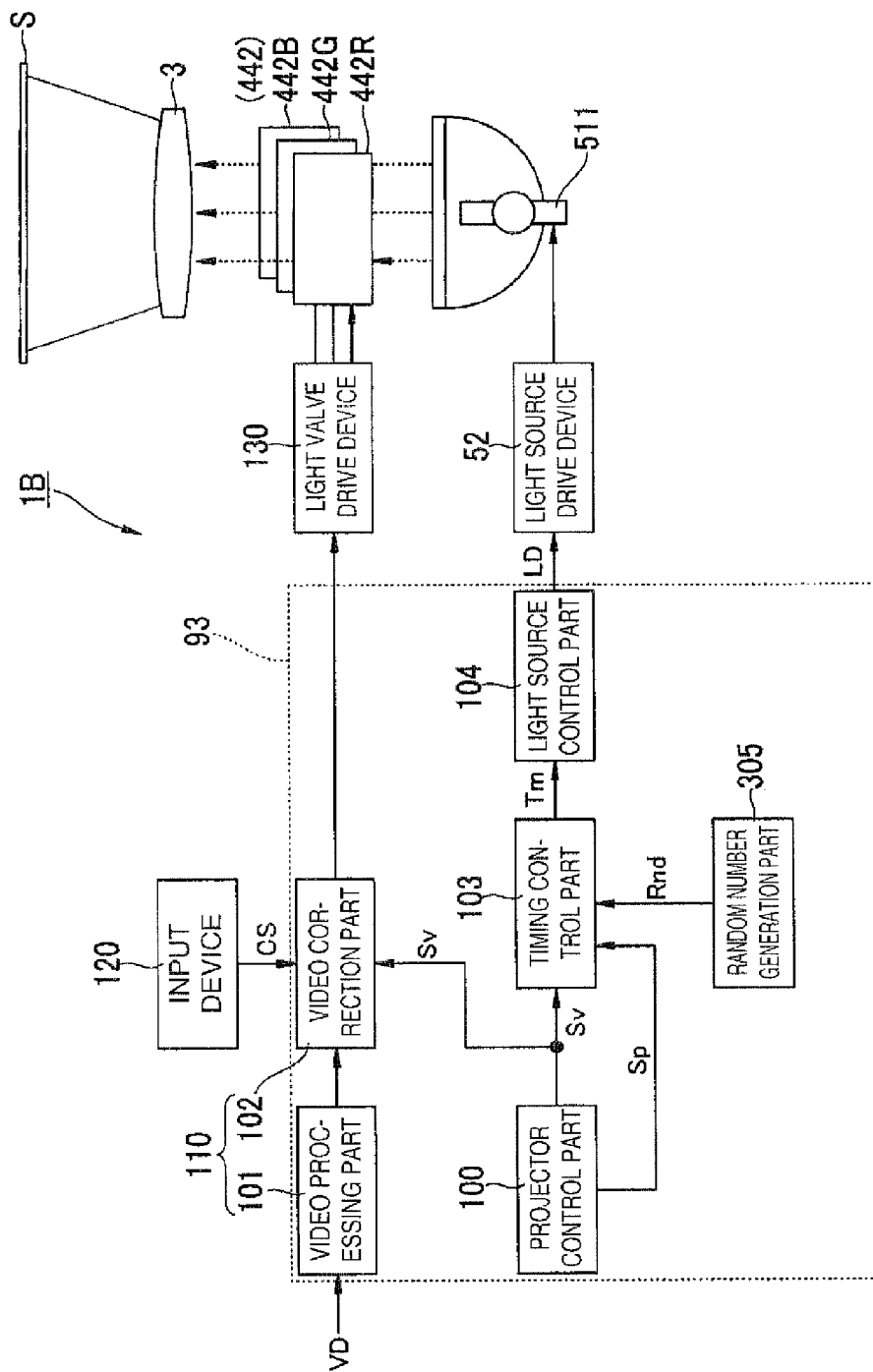
FIG. 7 is a block diagram showing a main part of a projector according to a third embodiment.

FIG. 7 is a block diagram showing a main part of the projector according to the third embodiment. FIG. 8 shows an operation flow of a timing control part provided in the projector according to the third embodiment.

A projector 1B of the embodiment has the same basic configuration as those of the first and second embodiments described as above. The projector 1B is different from that of the second embodiment in that random numbers are used for changing the synchronization timing. Accordingly, in the following explanation, the parts in common with the first and second embodiments will be appropriately omitted. Further, in FIGS. 7 and 8, the component elements in common with FIGS. 1 to 6 have the same signs and their detailed explanation will be omitted.

As shown in FIG. 7, a random number generation part 305 is provided in the control unit 93 of the projector 1B. In the lamp drive system of the projector 1B, the timing control part 103 is connected to the projector control part 100, the random number generation part 305, and the light source control part 104.

The projector control part 100 supplies the vertical synchronizing signal Sv of the liquid crystal light valve 442 and the projector activation signal Sp to the timing control part 103. The random number generation part 305 generates a random number as information for generation of the delay time d used for setting of the synchronization timing in the timing control part 103, and outputs the generated random number Rnd to the timing control part 103.

The random number Rnd generated in the random number generation part 305 may be a numeric value that may be used as the value of the delay time d as it is, or a numeric value used for calculation for generation of the delay time d in the timing control part 103. Or, the random number Rnd may be used as a reference number for reference to a table holding a plurality of delay times d.

Next, the operation of the timing control part in the projector having the above described configuration will be explained further in detail with reference to FIG. 8.

Figure 8:
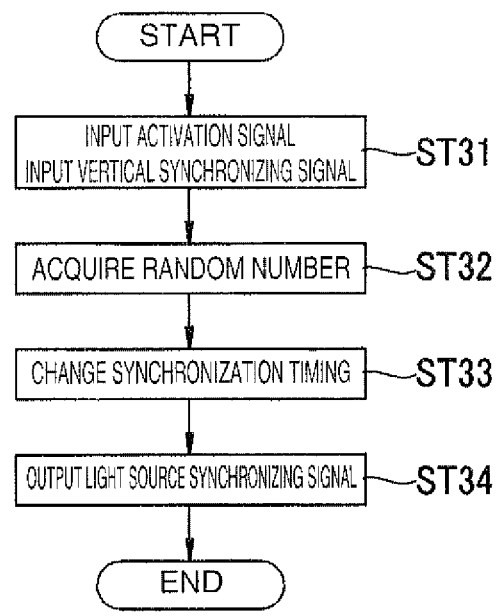
FIG. 8 shows an operation flow of a timing control unit according to the third embodiment.

The light source synchronizing signal output operation by the timing control part 103 according to the embodiment includes steps ST31 to ST34 shown in FIG. 8.

First, at step ST31, the projector activation signal Sp and the vertical synchronizing signal Sv are input from the projector control part 100 to the timing control part 103.

Then, at step ST32, the timing control part 103 acquires the random number Rnd from the random number generation part 305.

Then, at step ST33, the timing control part 103 sets the delay time din response to the random number Rnd acquired from the random number generation part 305, and changes the synchronization timing of the current drive signal LD with respect to the vertical synchronizing signal Sv. The method of setting the delay time d may be appropriately selected in response to the type of the random number Rnd. That is, the random number Rnd may be directly used as the value of the delay time d, the delay time d may be calculated by substitution of the random number Rnd into a predetermined operational expression, or a table may be referred to with the random number Rnd as a key and the delay time d may be acquired from the table.

Then, at step ST34, the timing control part 103 generates the light source synchronizing signal Tm based on the set delay time d, and outputs the signal to the light source control part 104.

Through the above described operation, the synchronization timing of the vertical synchronizing signal Sv of the liquid crystal light valve 442 and the current drive signal LD of the light source lamp 511 is changed.

Use Test

In order to confirm the suppression effect of brightness ununiformity according to the above described driving method, use tests were conducted with the activation time of the projector set to continuous 16 hours and the downtime set to continuous eight hours until the accumulation of the activation time becomes 3000 hours. As a result, no brightness ununiformity were caused in projected videos during periods of use. On the other hand, for comparison, a use test was conducted under the same condition without changing the synchronization timing with respect to each activation, and apparent brightness ununiformity were caused.

As explained in detail above, in the projector 1B of the embodiment, the timing control part 103 that controls the synchronization timing of the vertical synchronizing signal Sv and the current drive signal ID executes the operation of changing the synchronization timing based on the random number at each time when the projector 1B is activated. Thereby, the timing of the pulse period Ps in which the drive current of the light source lamp 511 increases and the selection timing of the scan line in the image formation area of the liquid crystal light valve 442 are shifted at each time when the use of the projector 1B is started. As a result, repeated radiation of the high-intensity illumination light is suppressed in the period of selection of a specific scan line of the liquid crystal light valve 442. In this manner, the brightness ununiformity caused when the liquid crystal light valve 442 and light source lamp 511 are driven over a long period may be suppressed. Further, in the embodiment, the delay time d in response to the random number is set and the synchronization timing is changed, and thereby, there is a low probability that the same delay time as the previously set delay time is set and increase in the brightness ununiformity may be suppressed.

Note that, in the embodiment, the synchronization timing of the liquid crystal light valve 442 and light source lamp 511 is changed at each time when the projector 1B is activated, however, the invention is not limited to that. For example, the synchronization timing may be changed at intervals of a plurality of (two to twenty) times of activation of the projector 1B. Further, like the first embodiment, the accumulated operating time is measured and the synchronization timing may be changed according to the method of the embodiment when the projector is activated after a lapse of a predetermined accumulated operating time.

As described above, the preferred embodiments according to the invention have been explained with reference to the drawings, however, obviously, the invention is not limited to the embodiments. Various shapes, combinations, etc. of the respective component members shown in the embodiments are just examples and various changes may be made based on the design request or the like without departing from the scope of the invention.

In addition, the specific description of the shapes, the numbers, the arrangements, the materials, the forming methods, etc. of the respective component elements of the projector are not limited to the embodiments, but changes may be appropriately made.

Further, in the above described embodiments, the projectors 1, 1A, 1B include the three liquid crystal light valves 442R, 442G, 442B, however, the invention is not limited to those. For example, the invention may be applied to projectors using one, two, four, or more liquid crystal panels. Furthermore, in the above described embodiments, the transmissive liquid crystal light valves 442 having different luminous flux incident surfaces and luminous flux exiting surfaces are used, however, reflective liquid crystal light valves having the same light incident surface and light exiting surface may be used.

In addition, in the above described embodiments, the projectors 1, 1A, 1B are formed as front-type projectors in which the projection directions of images with respect to the projected surfaces and observation directions of the images are nearly the same, however, the invention is not limited to those. For example, the invention may be applied to a rear-type projector in which the projection direction and the observation direction are opposite.

Note that the control unit 93 in the embodiments may be realized by dedicated hardware or may be formed by a memory and a CPU and programs for realization of the functions of the respective parts of the above described control unit 93 may be loaded in the memory and executed for realization of the functions.

Further, the programs for realization of the functions of the respective parts in the above described control unit 93 may be recorded in a computer-readable recording medium, the programs recorded in the recording medium may be read and executed in a computer system, and thereby, processing of the respective parts of the control unit 93 may be performed. Note that, "computer system" here includes OS and hardware such as peripheral devices.

Furthermore, "computer system" includes a homepage provision environment (or display environment) when a WWW system is used.

In addition, "computer-readable recording medium" refers to a portable medium including a flexible disc, a magnetooptical disc, a ROM, and a CD-ROM and a memory device such a hard disc built in the computer system. Further, "computer-readable recording medium" includes a medium that dynamically holds a program in a short period of time like a communication line when the program is transmitted via a network such as the Internet or a communication line such as a telephone line and a medium that holds a program in a given time like a volatile memory within the computer system as a server or client in this case. Furthermore, the program may be for realization of part of the above described functions or realization of the above described functions by a combination with a program already recorded in the computer system.

The entire disclosure of Japanese Patent Application No. 2013-089118, filed Apr. 22, 2013 is expressly incorporated by reference herein.

What is claimed is:

1. A projector comprising:
    an alternately-current-driven light source; and
    a liquid crystal light valve that modulates light output from the light source,
    wherein the light source and the liquid crystal light valve are driven under a condition that a current drive signal of the light source and a vertical synchronizing signal of the liquid crystal light valve are synchronized, and
    a synchronization timing of the current drive signal and the vertical synchronizing signal may be changed to a different synchronization timing; (i) at each time of activation or based on a number of times of activation; or (ii) accumulated operating time with a same synchronization timing.

2. The projector according to claim 1, wherein a reference value of the accumulated operating time for changing the synchronization timing is from one hour to 300 hours.

3. The projector according to claim 1, further comprising a timing control part that controls the synchronization timing;

(i) at each time of activation or based on the number of times of activation; or (ii) the accumulated operating time with the same synchronization timing.

4. The projector according to claim 3, further comprising:
a light source control part that controls the light source;
a light valve control part that controls the liquid crystal light valve; and
a light source drive device that drives the light source based on a control signal output from the light source control part,
wherein the vertical synchronizing signal for driving the liquid crystal light valve is input to the light valve control part and the timing control part,
the timing control part generates a light source synchronizing signal based on the vertical synchronizing signal and outputs the signal to the light source control part,
the light source control part generates the current drive signal synchronized with the vertical synchronizing signal based on the light source synchronizing signal and outputs the signal to the light source drive device, and
the light source drive device drives the light source based on the current drive signal.

5. The projector according to claim 3, wherein the current drive signal is an alternating current in which a current is increased in a predetermined pulse period, and
the timing control part sets a delay time of an output timing of the pulse period with respect to an input timing of the vertical synchronizing signal.

6. The projector according to claim 3, wherein the timing control part may refer to a memory part that stores information on a plurality of synchronization timings.

7. The projector according to claim 3, wherein the timing control part sets the synchronization timing based on a random number acquired from a random number generation part that generates random numbers.

* * * * *